US006366307B1

(12) United States Patent
Morrison

(10) Patent No.: US 6,366,307 B1
(45) Date of Patent: Apr. 2, 2002

(54) CLOCK INDEPENDENT PULSE WIDTH MODULATION

(75) Inventor: Robert D. Morrison, Star, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/534,803

(22) Filed: Mar. 24, 2000

(51) Int. Cl.[7] .............................. B41J 2/435; B41J 2/47
(52) U.S. Cl. ...................................... 347/249; 348/252
(58) Field of Search ............................... 347/235, 237, 347/239, 240, 249, 248, 250; 368/113; 358/296, 298; 348/537; 375/373, 371

(56) References Cited

U.S. PATENT DOCUMENTS

| 4,777,496 A | | 10/1988 | Maejima et al. | ............. 347/172 |
|---|---|---|---|---|
| 5,185,768 A | * | 2/1993 | Ferraiolo et al. | ........... 375/373 |
| 5,438,353 A | | 8/1995 | Morrison | ..................... 347/250 |
| 5,477,330 A | * | 12/1995 | Dorr | .......................... 358/296 |
| 5,760,816 A | | 6/1998 | Morrison | ..................... 347/247 |
| 5,793,709 A | * | 8/1998 | Carley | ......................... 368/113 |
| 5,940,136 A | * | 8/1999 | Abe et al. | ................... 348/537 |
| 5,990,923 A | | 11/1999 | Morrison | ..................... 347/252 |

* cited by examiner

Primary Examiner—Hai Pham

(57) ABSTRACT

A system is provided for enabling a pulse width modulator to render video data for a laser at a frequency independent of the operating frequency of the pulse width modulator. The system includes phase measuring circuitry, edge output determining circuitry, edge location circuitry, and a summer. The phase measuring circuitry is operative to detect a phase offset on a scan line for a laser. The edge output determining circuitry is operative to determine which system clock cycle to output an edge on the system clock to act as if it were on a video clock. The edge location circuitry is operative to locate placement of an edge for a given pixel. The summer communicates with the phase measuring circuitry, the edge output determining circuitry, and the edge location circuitry. The summer is operative to combine values from the phase measuring circuitry, the edge output determining circuitry, and the edge location circuitry to generate a desired video signal. A method is also provided.

20 Claims, 3 Drawing Sheets

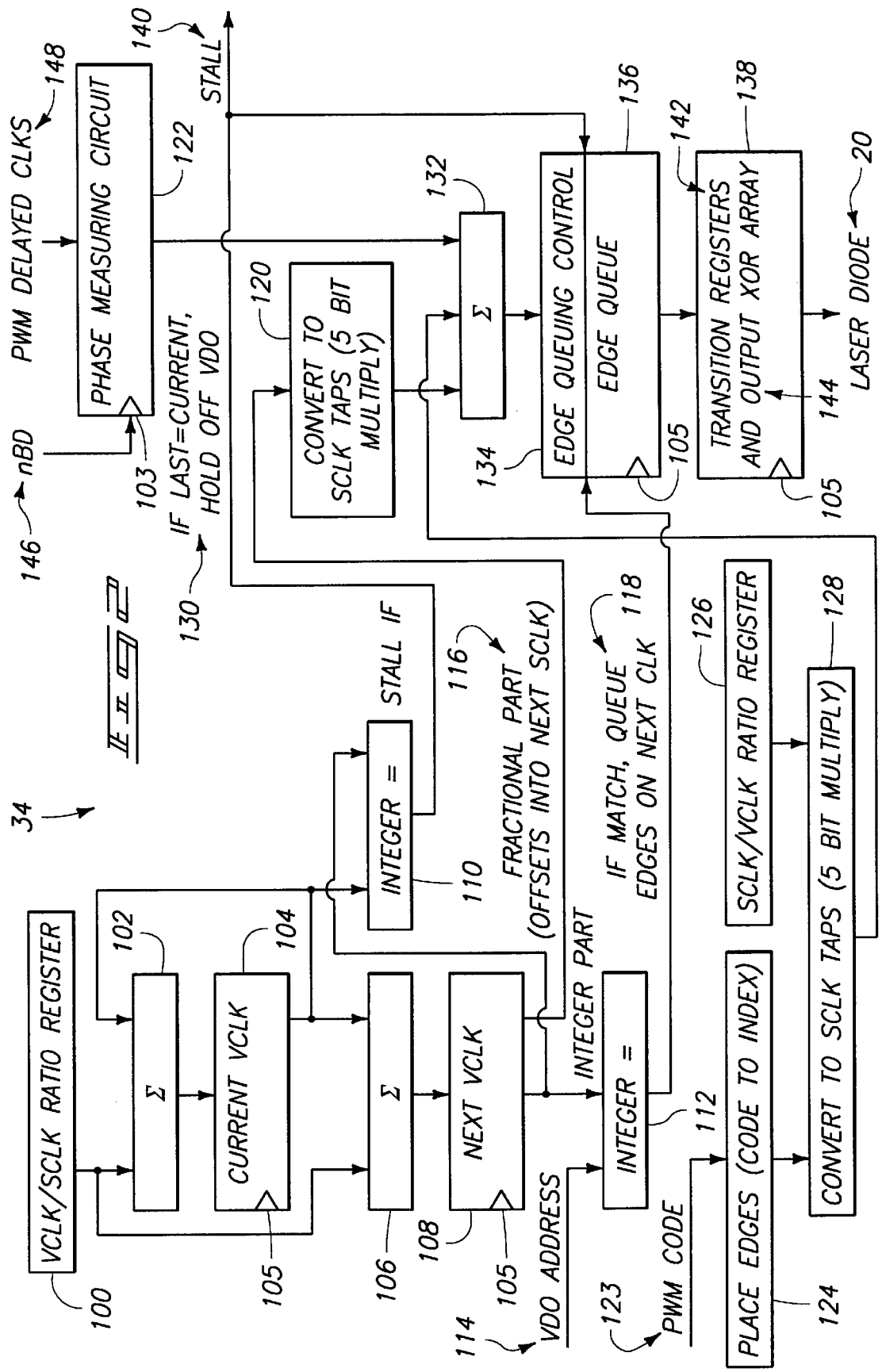

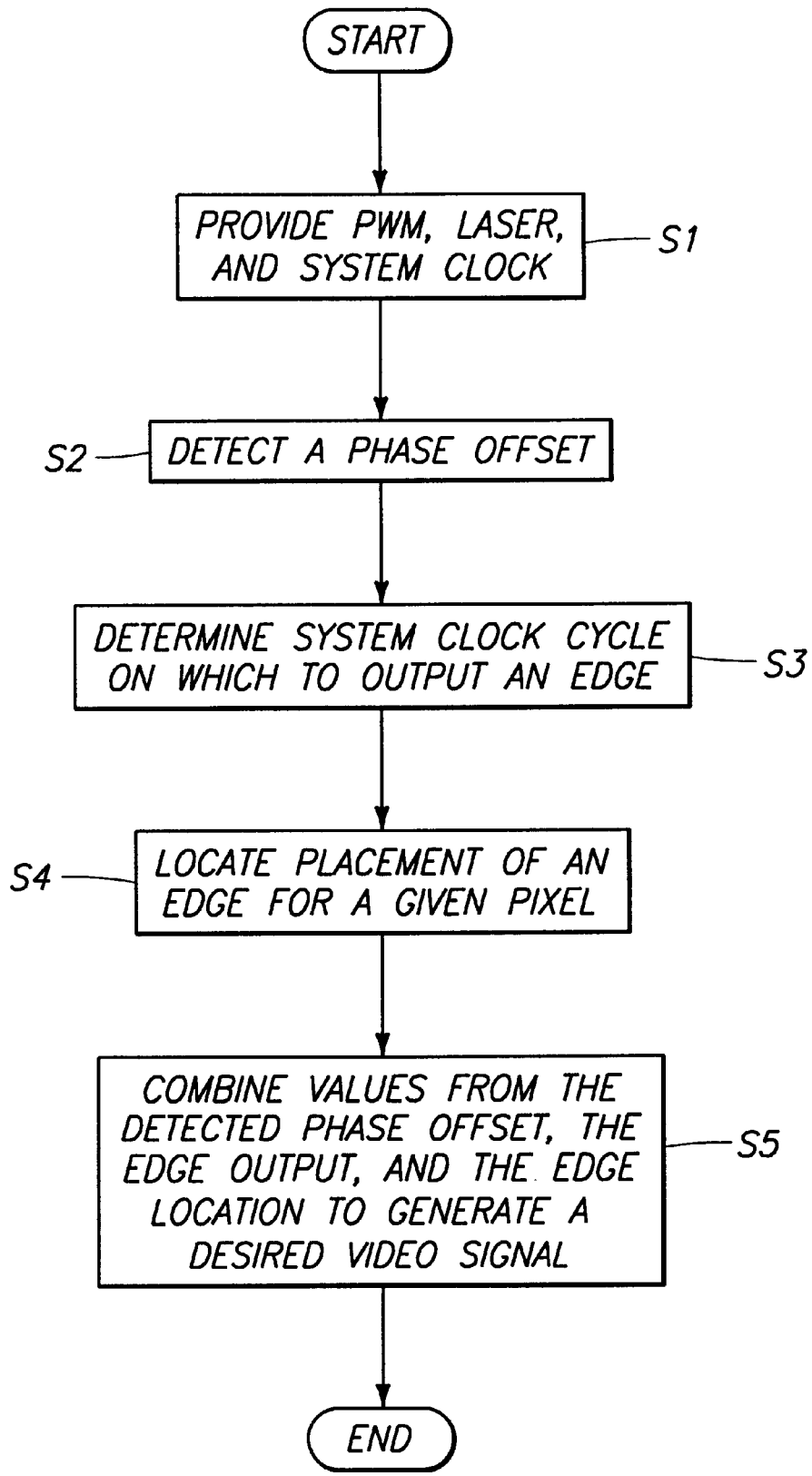

CLOCK INDEPENDENT PULSE WIDTH MODULATION

FIELD OF THE INVENTION

This invention pertains generally to image transfer technology. More particularly, this invention relates to clock independent pulse width modulation that enables generation of laser printer data at a desired frequency regardless of the operating frequency of the pulse width modulator.

BACKGROUND OF THE INVENTION

When rendering images using laser printer technology, a latent image is created on a surface of an insulating, photo-conducting material usually in the form of a rotating drum by selectively exposing areas on the surface of the drum to light. In operation, laser printers print pages by applying black toner onto selected small regions of fixed size referred to as pixels. By placing toner in only a portion of a pixel region, it is possible to create the effect of shades of gray. One presently recognized technique for placing toner in only a portion of a pixel region uses pulse width modulation (PWM). However, there exists a need to improve presently available prior art techniques as described below.

Pursuant to laser printer technology, a latent image is created on a surface of an insulating, photo-conducting material by selectively exposing areas of the surface to light. For the case of a laser printer, the surface is in the form of a rotating drum. A difference in electrostatic charge density is created between areas on the surface depending on the degree to which such areas are exposed to light. A visible image is then developed on the drum using one or more types of electrostatic toner. For the case of black and white printing, a single, black toner is used. For the case of color printing, multiple different color toners are used. Each toner is selectively attracted onto the photoconductive surface of the drum either exposed or unexposed to light, depending on the relative electrostatic charges on the photoconductive surface, characteristics of the development toner, and the type of toner used. Depending on the particular implementation, the photoconductive surface may be either positively or negatively charged, and the toner system similarly may contain negatively or positively charged particles.

The developed image is then transferred from the drum surface onto a sheet of paper. More particularly, a transfer roller is imparted with an electrostatic charge that is opposite to that of the toner. The transfer roller is rotated in proximity with the photoconductive surface of the drum. The transfer roller pulls the toner from the photoconductive surface, transferring the toner onto a charged sheet of paper. The transferred toner maintains the pattern of the image that was developed on the photoconductive surface.

In operation, a laser printer scans a laser beam horizontally across the photosensitive, electrically charged drum. By modulating the laser beam via a pulse width modulator (PWM), resulting variations in charge will impart proportionate amounts of toner being deposited onto a sheet of paper.

More particularly, laser printers print pages of information onto individual sheets of paper by applying a particular toner, such as black toner, to selected small regions of fixed size referred to as pixels. By placing toner in only a portion of a pixel region, it is possible to create the effect of shades of gray. One technique for placing toner in only a portion of a pixel region uses a pulse width modulation (PWM) technique.

Laser printers are distinguished from other types of printers by their ability to place precise amounts of toner into very small regions of a page at relatively high speed. As a result, laser printers generate image quality that is far greater than most other types of printers. However, laser printers operate by scanning a photoconductive drum upon which a rendered image is held. This results in an intrinsic quantization of the image in the vertical direction of the page. Additionally, there exist limitations in circuitry that is used to modulate the horizontal scanning. These limitations result in quantization of the image so that a single cell, or pixel, is effectively formed. If pixels are made small enough, the quantization effects can be made imperceptibly small to the human eye. However, there are practical limits. First, the vertical quantization is limited by the scan rate and the speed with which the photoconductive drum is rotated. Secondly, horizontal quantization is limited by the ability to transfer data in serial form to the scanning laser. The horizontal quantization limits the number of transitions that modulate the scanning laser, thereby limiting the density of horizontal dots that are placed onto a printed page.

In an effort to increase the resolution capability of laser printers, various techniques have been used to increase the number of horizontal dot components of a laser video signal generated by a laser. Irrespective of the technique used to generate horizontal dot components, the laser needs to be phase locked to a single signal edge that is referred to as a beam detect. The beam detect provides a reference signal that indicates when the scanning laser begins to sweep across the photosensitive drum.

In operation, a pixel clock is phase locked to the beam detect signal. One technique uses a clock generator as described in U.S. Pat. Nos. 5,438,353 and 5,760,816 listing Applicant as the inventor, and describing such clock generators. Such U.S. Pat. Nos. 5,438,353 and 5,760,816 are herein incorporated by reference.

According to the above-referenced clock generator prior art technique, a clock generator uses a chain of delayed clocks in order to generate phase locked, variable phase video output signals. More particularly, the clock generator comprises a variation of a pulse width modulator (PWM). For example, U.S. Pat. No. 5,438,353 discloses a variable phase version clock generator. Additionally, U.S. Pat. No. 5,760,816 discloses a reduced clock domain version clock generator which is referred to as a phase adjusted pulse width modulator (PWM). Such U.S. Pat. Nos. 5,438,353 and 5,760,816 are herein incorporated by reference as indicating details presently understood in the art.

Improvement has been made to the clock generator technique described in the above-referenced patents. More particularly, it is desirable to generate horizontal dots within a single pixel clock time, thereby increasing the effective resolution of a printed page. Such a technique generates sub-pixels within a pixel dot clock cycle. This technique can be accomplished using a phase adjusted, or phase locked, pulse width modulator. See U.S. patent application Ser. No. 09/534,747, entitled "A METHOD AND DEVICE FOR TIME SHIFTING TRANSITIONS IN AN IMAGING DEVICE", filed Mar. 24, 2000, naming the inventors as Robert D. Morrison and Eugene A. Roylance, which application describes one technique using phase adjusted transition placement. Such U.S. patent application Ser. No. 09/534,747 is herein incorporated by reference. Such U.S. Patent Application provided a substantial improvement over previous prior art techniques disclosed in U.S. Pat. Nos. 5,438,353 and 5,760,816 wherein a clock generator of such previous prior art techniques introduces error in dot placement when using the clock generator on pixel boundaries. A standard phase locked loop generally cannot be used in such an environment because it is not possible to generate an error signal that would correct the pixel dot clock. More particularly, there is only one beam detect edge that the pixel dot clock can lock phase to, and that phase is required to be rigidly maintained for the length of a scanned line.

However, there is still a problem which results from implementing the above-referenced clock generators because the clock frequency that specifies the width of video pixels is usually different than the clock that is used to run the formatter processor. The clock used to run the formatter processor formats user data into a raster image that can modulate the laser. As a result, three problems occur. First, there are significant delays induced by the handshaked transfer of data from the processor to the video circuitry. The processor is running on a system clock, while the video circuitry is running on a video clock. Secondly, ASIC design and testing is significantly hampered by multiple clock domains that do not easily communicate with each other. The circuitry on one clock domain is completely asynchronous to circuitry in the other clock domain. Thus it is a requirement, for example, that there be two completely independent test vector sets. As a result, portions of the interface between the clock domains will not be well tested. Furthermore, there will be nearly a doubling of overhead in setting up the test. Thirdly, the nature of an asynchronous interface that is provided between clock domains and the nature of the current pulse width modulation (PWM) technology is such that if either clock domain frequency changes, the ASIC is often unable to correctly function due to the change in ratio of the frequencies. For example, if the printer scanner or system clock speeds change for any reason, the ASIC is unable to correctly function because the handshake between clock domains cannot always function in the new clock domains. This limits the ability to re-use the ASIC when a different printer engine is developed.

Even though it may be possible to move the system clock frequency in order to match the video clock frequency, it would still be necessary to provide two separate clocks. A system clock has a frequency that is defined by processor performance, whereas a video clock has a frequency that is defined by the print engine. Although it may be possible to run such clocks at the same frequency, rarely will it be possible to run the system clock at the same frequency as the video clock, or even to run such clocks at frequencies wherein one is a multiple of the other (wherein scaling can be used to adjust the frequencies where they are multiples of one another). Accordingly, a first clock is needed to step the processor and memory accesses, while another clock is needed to provide a reference that proscribes the width of a video frequency. The resulting two frequencies would almost never be derivable from each other since the processor memory access performance drives the system clock speed, while the physical mechanics of a laser printer engine drives the video clock speed. Accordingly, the video clock generates a fixed number of delayed clocks within a pixel in order to permit sub-pixel pulse width modulation. However, the two frequencies are not derivable from one another, and are not functionally dependent thereupon.

Therefore, there exists a need for improved techniques for implementing pulse width modulations (PWMs) with lasers on image forming devices.

SUMMARY OF THE INVENTION

An apparatus and method, in the form of a circuit, are provided for modifying and adding functionality to a pulse width modulator (PWM) in order to enable the generation of video data at any frequency, regardless of the operating frequency of the pulse width modulator (PWM). For the case where a pulse width modulator (PWM) is clocked at a system processor frequency, an entire associated ASIC will have a single clock, and will be able to issue video data in order to modulate a laser at any desired video frequency. Because the video frequency is no longer fixed, for example, with a crystal oscillator, but can now be programmed into the ASIC, it is potentially possible to use the same ASIC or even the same formatter with multiple printer engines with different video frequency requirements. Accordingly, ASIC development (including costs and development time) has the potential to be made independent of a particular printer engine development path.

According to one aspect, a system is provided for enabling a pulse width modulator to render video data for a laser at a frequency independent of the operating frequency of the pulse width modulator. The system includes phase measuring circuitry, edge output determining circuitry, edge location circuitry, and a summer. The phase measuring circuitry is operative to detect a phase offset on a scan line for a laser. The edge output determining circuitry is operative to determine which system clock cycle to output an edge on the system clock to act as if it were on a video clock. The edge location circuitry is operative to locate placement of an edge for a given pixel. The summer communicates with the phase measuring circuitry, the edge output determining circuitry, and the edge location circuitry. The summer is operative to combine values from the phase measuring circuitry, the edge output determining circuitry, and the edge location circuitry to generate a desired video signal.

According to another aspect, a clock-independent pulse width modulator includes a pulse width modulator, a system clock, circuitry, and a summer. The pulse width modulator is operative to generate video data for rendering an image via a laser. The system clock is operative to generate a system clock signal. The circuitry includes phase offset measuring circuitry, edge output determining circuitry, and edge location circuitry. The phase offset measuring circuitry is operative to detect a phase offset on a scan line of a laser. The edge output determining circuitry is operative to determine which system clock cycle to output an edge on the system clock to act as if it were on a video clock. The edge location circuitry is operative to locate placement of an edge for a given pixel. The summer communicates with the phase measuring circuitry, the edge output determining circuitry, and the edge location circuitry. The summer is operative to combine values from the phase offset measuring circuitry, the edge output determining circuitry, and the edge location circuitry to generate a desired video signal.

According to yet another aspect, a method is provided for rendering an image onto an image transfer surface. The method includes: providing a laser, a pulse width modulator, and a system clock, the laser configured to generate an optical scan path onto an image transfer surface in response to video data that is received from the pulse width modulator; detecting a phase offset on a scan line of a laser; determining on which system clock cycle to output an edge such that the system clock is configured like a video clock; locating placement of an edge for a given pixel; and combining values from the detected phase offset, the edge output, and the edge location to generate a desired video signal.

DESCRIPTION OF THE DRAWINGS

Preferred embodiments of the invention are described below with reference to the following accompanying drawings depicting examples embodying the best mode for practicing the invention.

FIG. 2 is a circuit schematic block diagram which is used to explain one implementation of the clock independent pulse width modulator of FIG. 1.

FIG. 3 is a logic flow diagram illustrating one method for generating video sign for laser image forming devices that have multiple lasers and/or multiple optical paths.

DETAILED DESCRIPTION OF THE INVENTION

Figure 1:
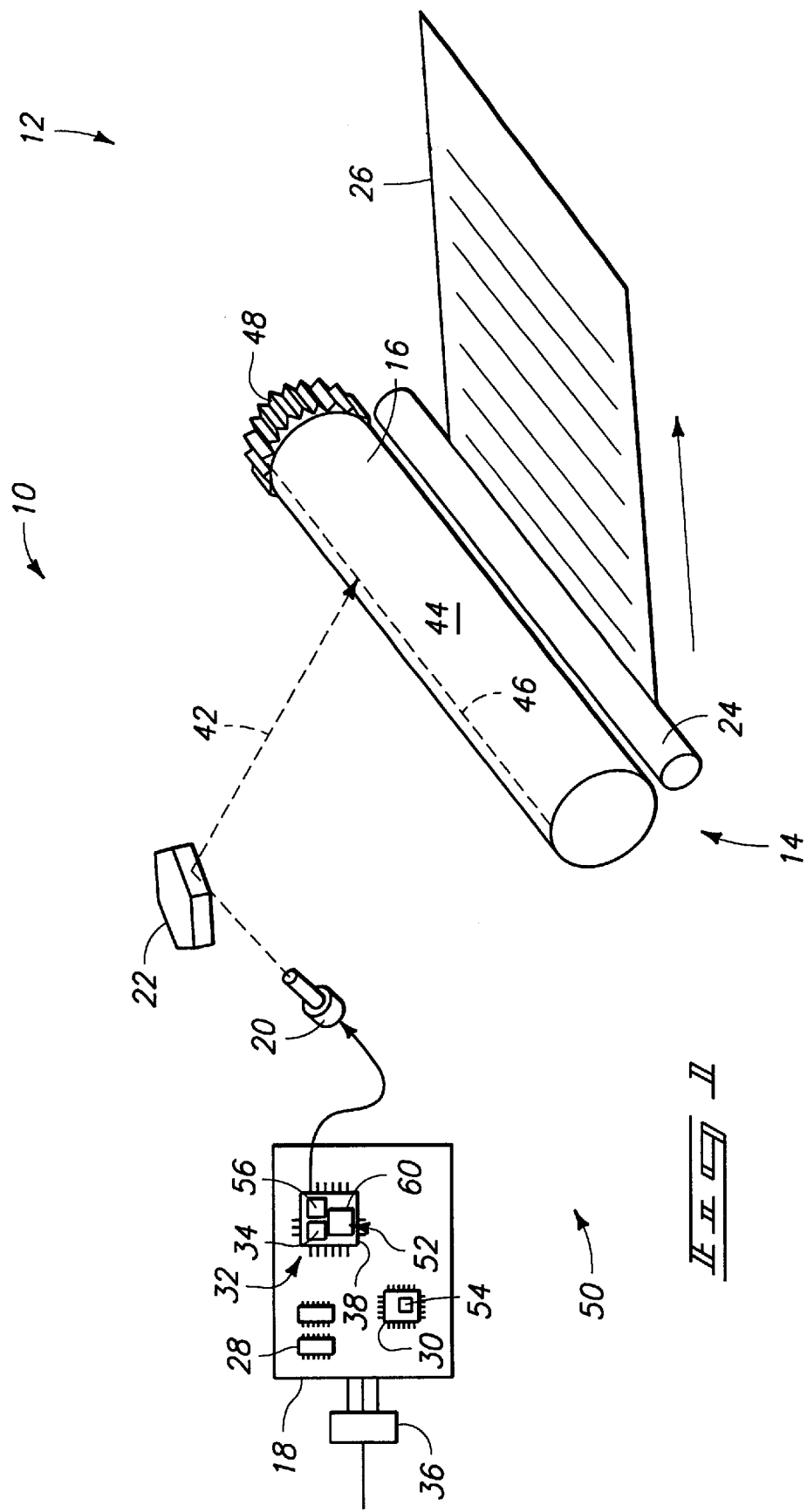
FIG. 1 is a schematic block diagram of one image transfer device using a clock independent pulse width modulator (PWM) according to one aspect of the present invention.

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention. One exemplary implementation is described below and depicted with reference to the drawings comprising a system for enabling the generation of video data at any frequency regardless of the operating frequency of a pulse width modulator to accurately generate an output image by way of a laser printer. Although the present invention is described in terms of laser printer technology, it will be apparent to one of ordinary skill in the art that the present invention is equally applicable to other similar forms of image transfer technology that use a pulse width modulator (PWM), such as photocopying. Accordingly, while the invention is described via a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference as being presently understood in the art.

FIG. 1 illustrates a schematic block diagram of the present invention comprising a system for modulating the operating frequencies of a pulse width modulator (PWM) to place pixels onto a photoconductive surface for holding an image to be printed onto paper identified generally by reference numeral 10. An image forming device, or image rendering device, 12 is illustrated in one form as a laser printer 14. Laser printer 14 includes photoconductive drum 16, printed circuit assembly (PCA) 18, laser diode, or laser, 20, mirror 22, and transfer roller 24.

Printed circuit assembly (PCA) 18 embodies the general formatter electronics for printing an image onto paper 26. PCA 18 includes memory 28, such as Random Access Memory (RAM), for holding an image to be printed; microprocessor 30, for processing the image to be printed; and general circuitry 32. General circuitry 32 includes a pulse width modulator (PWM) 34, clock translation circuitry 56, and memory 60. An input/output (I/O) interface 36 is provided for connecting PCA 18 to separate computing components. General circuitry 32 is embodied in general ASIC circuitry 38. One or more of microprocessor 30, PWM 34, and general circuitry 32 provides processing circuitry 40.

PCA 18 communicates with laser diode 20 which emits a laser beam 42. Laser beam 42 is reflected off rotating scanning mirror 22 and onto outer surface, or image transfer surface, 44 of drum 16 so as to define beam path 46. Drum 16 is a photoconductive, electrically charged drum configured to hold an image to be transferred, or printed, onto transfer roller 24 and subsequently onto paper 26. Drum 16 includes a gear drive 48 that meshes for co-rotation with other gear drive components and a drive motor (not shown) of laser printer 14 which cooperate to rotate drum 16.

Although surface 44 is shown in one embodiment in the form of drum 16, it is understood that other forms are possible. For example, surface 44 can optionally be configured as a continuous, photoconductive belt (not shown) or other transfer medium whether photoconductive or not.

Laser diode 20, comprising a laser, cooperates with photoconductive drum 16, mirror 22, and transfer roller 24 to form a printer engine 50 that prints toner images onto paper 26. Printer engine 50 comprises a unit within printer 14 that performs actual printing onto paper 26. Printer engine 50 includes laser 20 and associated mechanisms needed to transfer toner onto paper.

PWM 34 comprises a clock independent pulse width modulator (PWM). PWM 34 uses a system clock 54 from microprocessor 30 along with an edge placement algorithm 52 to generate a laser output signal that drives laser 20 at a required time.

PWM 34 drives laser 20 in combination with mirror 22 along optical laser beam path 46. PWM 34 comprises a clock independent pulse width modulator that is used to generate video signals that drive laser 20.

As shown in FIG. 1, microprocessor 30 includes a system clock 54 that internally times operation of microprocessor 30 as well as memory accesses to memory 28. Accordingly, system clock 54 replaces a video clock which has been implemented in the prior art to step a pulse width modulator according to prior art techniques. According to the implementation depicted in FIG. 1, PWM 34 generates a fixed number of delay clocks in order to generate sub-pixel steps. According to one example, PWM 34 generates 32 delay clocks. Details of such implementation are described in the above-referenced prior art U.S. Pat. Nos. 5,438,353 and 5,760,816, already incorporated by reference.

Also according to FIG. 1, ASIC circuitry 38 includes clock translation circuitry 56. Circuitry 56 is utilized to implement the features of Applicant's invention. More particularly, circuitry 56 takes a pixel number and a pixel modulation edge, and translates them to an appropriate clock cycle and sub-cycle location within the system clock frequency. The pixel number is the number of pixel clocks occurring from the start of a given line. The pixel modulation edge is the sub-pixel pulse edge location provided within a pixel. Translation to the appropriate clock cycle is realized by effectively multiplying the video clock edge location by the ratio of the system clock period to the desired video clock period. However, no actual multiplication or division circuitry is utilized since such implementation would be relatively expensive to implement. Instead, a cumulative error correction implementation is utilized in order to determine the exact edge placement in such a way that placement accuracy is maintained all the way through a scan line. Such edge placement is realized utilizing an edge placement algorithm 52. A cumulative error correction technique allows a video period time to be programmed into a register, thereby allowing any frequency from DC up to the limit of PWM 34 to be specified as a video frequency. Accuracy of the resulting edge placement is typically limited by the number of bits that are used in order to compute the error in placement and the size of the PWM delay tap.

Accordingly, a technique is provided for reducing design complexity, testing, and implementation difficulty in realizing a phase locked pulse width modulator (PWM) output that drives a laser scanner, such as a scanner within laser printer 14. An additional advantage is provided in that complete programmable video frequencies are allowable from zero Hertz on up to a limit of the PWM delay taps. Such result is realized by removing the video clock and connecting all circuitry to a processor, or system, clock. Subsequently, the correct relative PWM edge placement is computed as if there was a video clock present. Accordingly, an entire design can be clocked from a simple reference oscillator, thereby utilizing less circuitry. As a result, implementation and testing of an ASIC is vastly simplified, such that in some cases ASIC development can be completely freed from a printer engine development path.

As shown in FIG. 1, it is understood that general circuitry 32 includes phase measuring circuitry, edge output determining circuitry, edge location circuitry, and a summer. The phase measuring circuitry is operative to detect a phase offset on a scan line for a laser. The edge output determining circuitry is operative to determine which system clock cycle to output an edge on a system clock to act as if it were on a video clock. The edge location circuitry is operative to locate placement of an edge for a given pixel. The summer communicates with the phase measuring circuitry, the edge output determining circuitry, and the edge location circuitry. The summer is operative to combine values from the phase measuring circuitry, the edge output determining circuitry, and the edge location circuitry in order to generate a desired video signal. General circuitry 32 (as embodied in general ASIC circuitry 38) also includes clock translation circuitry 56.

FIG. 2 illustrates one implementation of a clock independent pulse width modulator (PWM) 34 which utilizes novel aspects of Applicant's invention. For example, a phase measuring circuit 122 is incorporated within PWM 34. More particularly, circuit 122 receives a beam detect signal 146 at an input pin 103. Circuit 122 also receives pulse width modulator (PWM) delayed clocks 148. In response, circuitry 122 generates an output signal that is delivered to a summer 132, wherein summer 132 queues up edges by way of an edge queuing control 134 and an edge queue 136. The queued up edges are then output to block 138 comprising transition registers 142 and output exclusive or (XOR) array 144. Such above-described implementation for circuit 122 is described in greater detail in U.S. patent application having attorney's docket number 10990775-1, already incorporated by reference. More particularly, phase measuring circuit 122 comprises phase adjusted pulse width modulator (PWM) circuitry that measures the phase of beam detect signal 146. PWM delayed clocks 148 are then used by circuit 122 in order to measure the phase of the beam detect. The output signal from circuit 122 delivered to summer 132 comprises a measure of what the phase offset is on every scan line for laser beam 42 (of FIG. 1). Computationally, such measure is added in to where all the edges are placed before they are output to laser diode 20.

As shown in FIG. 2, laser diode 20 does not form part of circuit 34, but is added here so as to illustrate the relationship of the output from circuit 34, and more specifically from block 138, to laser diode 20.

Additional implementation features for clock independent PWM 34, which are presently understood in the art, include the utilization of PWM code 123. More particularly, PWM code 123 comprises video data that is output on every pixel. Such output forms an indication of where in a given pixel it is desirable to place an edge. For example, it may be desired to place an edge at a 25% point and a 75% point, within a given pixel range. Such example would generate a pixel that has a 50% pixel width. Pulse width modulator (PWM) code 123 provides an input to block 124. Block 124 represents the placement of such edges as described above. Block 126 comprises an SCLK/VCLK ratio register to 126. Block 124 and register 126 provide inputs to block 128, wherein block 128 represents circuitry that converts the edges of block 124 into SCLK (system clock) taps, using a 5-bit multiplication. Block 128 delivers an output to summer 132.

As used above, SCLK refers to a system clock while VCLK refers to a video clock. For purposes of this disclosure, VCLK is not an actual separate clock, but is instead a synthesized, or synthetic, clock. Accordingly, VCLK is synthesized from SCLK using the techniques taught herein. In this manner, the need for a plurality of clocks such as separate system clocks and video clocks is eliminated using Applicant's invention.

Remaining portions of circuitry within PWM 34 are operative, in the absence of a video clock, to take any clock input that happens to be available for the case where there is no video clock input presently otherwise available. One example comprises receiving a system clock input at pin 105 from system clock 54 of microprocessor 30 (see FIG. 1). More particularly, clock input pins 105 are shown on blocks 104, 108, 136 and 138 of FIG. 2.

VCLK/SCLK ratio register block 100 represents a VCLK/SCLK ratio register. Register 100 delivers an output to summer 102. In response, summer 102 generates an output to current VCLK block 104. Current VCLK 104 also generates an output that is delivered to summer 102 as well as to block 110. Summer 106 generates an output to next VCLK block 108. Next VCLK block 108 generates an output for blocks 110 and 112. Block 110 also receives an input from VDO address 114 so as to generate an output for the case where, when there is a match, edges are queued on the next clock pursuant to the requirements of logical rule 118; namely, if there is a match, edges are queued on the next clock. Similarly, block 108 generates an output when logical rule 116 is met; namely, where a fractional part exists, or an offset is provided into the next SCLK. For the case where logical rule 116 is met, block 112 delivers an output to block 120.

For purposes of this disclosure, it is understood that any clock signal can be used to drive clock input pins 105 as shown in FIG. 2. The only requirement that is necessary is that there be a relationship between a desired video pixel frequency and the clock signal delivered to clock input pins 105. Preferably, clock signal input pins 105 receive input signals from a central processing unit, such as from system clock 54 of microprocessor 30 (of FIG. 1). However, it is understood that other implementations can utilize any system clock, or any clock capable of driving such circuitry 34. As a consequence, there is no need to have a separate video clock which then would need to be synchronized with operation of circuitry 34.

Essentially, the circuitry associated with blocks 100, 102, 104, 106, 108, 110 and 112 cooperate to keep track of where a video clock would be if a video clock were actually present. Essentially, such circuitry computes every clock cycle how many video clocks would be otherwise available. Typically, such number comprises an irrational number. For example, after one clock cycle, there may exist a system clock of 66 mHz, and it may be desirable to somehow synthesize a video clock of 23.47 mHz. Essentially, the current VCLK register keeps track of an integer plus fractional number which represents the portion of a video clock that would have occurred if there had been one in existence.

For example, where a system clock is 66 mHz and a video clock is 23 mHz, a current VCLK register will not be capable of reaching a single unitary video clock until after about three system clocks have occurred.

Summer 102 is used to determine what current video clock is present simply by incrementing the current video clock (VCLK) by the ratio of the video clock (VCLK) to the system clock for each system clock time that transpires. So, for example, in one system clock, the number present in the current VCLK register will be 0.35712. Then, after the occurrence of a second system clock, such number will double so that the register will contain a number on the order of 0.71424. Then, after the occurrence of a third system clock, the number will be 1.0714. Such numbers will add some ratio value each time to the preceding number. Each time that such number is incremented, the integer portion may or may not increment. In other words, for the above exemplary case, when the integer portion went from 0 to 1, that was when a new pixel had just passed over. The corresponding register implementation forms a method of keeping track of what the video clock would have been, and thus a way of telling the system what time in system clock counts a pixel is occurring.

Block 110 is configured to keep track of the current video clock and the next occurring video clock. If the current video clock and the next occurring video clock are equal, then an integer boundary has not yet been crossed. In other words, the current video clock (the top one) might hold a value of 0.71, and the next video clock might hold a value that it contained one cycle earlier. Accordingly, it will hold 0.35 and the current video clock will hold the current value that just got added in, which would be 0.71. Such equal portion is checking the integer portion in order to see if they are the same. For this particular exemplary case, both integer parts equal 0, because one value is 0.35 and the other value is 0.71.

If both of the above numbers are equal, this indicates that the pixel boundary has not yet been crossed so there is no need to do anything. Accordingly, a stall signal 140 is generated which is delivered to the pulse width modulator (PWM). The stall signal stalls the incoming PWM code 123 as well as generation and queuing logic, and freezes the rest of the video circuitry, telling such circuitry that it does not need to do anything on this clock cycle. Accordingly, the stall signal is delivered because there has not been a detected passage onto a new pixel.

However, if the next video clock happens to be 0.71, and the current video clock happens to 1.06, such example indicates that the pixel boundary has just been crossed. Accordingly, block 110 indicates an "integer equal" condition, the lack of such condition indicating that the pixel boundary has been crossed (where the pixel boundary is defined by the video clock). Any fractional portion is ignored, and only an integer portion is utilized in determining whether the pixel boundary has just been crossed. As indicated in FIG. 2, block 108 delivers an output to block 112 comprising an "integer part".

As shown in FIG. 2, block 108 contains a value for "the next video clock (NEXT VCLK)". Block 108 delivers an integer portion of the value in block 108 to blocks 110 and 112. Accordingly, an integer portion of the value stored in block 108 is delivered to blocks 110 and 112, respectively.

The implementation of the circuitry of PWM 34 is carried out to overcome a significant problem. More particularly, the system clock (SCLK) does not necessarily run at the same frequency as the video clock (VCLK) that is desired to drive a laser. Accordingly, the circuitry of PWM 34 in FIG. 2 is configured to tell the video circuitry to stop every once in a while because, at a given point in time, the system clock (which is being used to form the video clock) is going a lot faster than the desired video clock. If such implementation were allowed to proceed using the system clock, the incoming video data (PWM code 123) would be generated much too fast for the desired video output. Accordingly, it becomes necessary to find a technique for holding off the incoming video data so as to prevent PWM codes from being lost, or rather, to hold the current state of video data until is ready to be used. In summary, it is desirable only to process video data once every video clock, but not necessarily every system clock.

Accordingly, the circuitry of PWM 34 is implemented solely using a system clock without having the benefit of a traditional video clock (VCLK). Accordingly, there exist some system clocks where it will not be necessary to do anything with the video data. Therefore, it becomes necessary to stall the video system which is derived using the system clock. Essentially, a stall command is delivered by STALL output signal 140, which is delivered to video circuitry within ASIC 38 (of FIG. 1). PWM 34 of FIG. 2 receives data (PWM code) from such video circuitry in order to generate a video signal for driving a laser and generating an image. For example, by sending a stall command via output signal 140, the system is instructed to not send any more PWM code data until the pixel boundary has been crossed, which might occur several system clocks later. From a time perspective, current VCLK is later in time than next VCLK such that next VCLK holds a smaller relative time than current VCLK.

A stall condition is determined by looking at the current video clock within block 104 and the next video clock within block 108. The contents within blocks 104 and 108 will be one system clock apart, as determined by a ratio of VCLK to SCLK. For example, if the next VCLK is 0.35 and the current one is 0.71, then they both contain the same integer portions so it is desired that nothing be done during the current pixel and, in response, a stall signal is generated at output 140.

However, if the integer portions within blocks 104 and 108 are different, it is desirable to not generate a stall signal at output 140. Instead, for the example described above, if the integer parts are different such that VCLK is 1.6 and the next VCLK is 0.71, then the integer portions differ, and the value in block 110 (integer=) determines that a stall condition is not met by "STALL IF" pursuant to rule 130. Hence, a stall signal is not sent to video circuitry (not shown) via output 140. Accordingly, the latest video data has just been processed, and computation proceeds to obtain the next video data.

By such implementation, it is guaranteed that the next video data is retrieved only when the time for it is needed. The PWM code generation logic will then generate a new PWM code. In operation, the PWM codes come on demand, with PWM pacing the video logic.

Although the above techniques describe when to use video data, there still exists a problem in determining what to do with the video data. The remaining circuitry of PWM 34 shown in FIG. 2 is configured to convert the PWM code from a video clock time to a system clock time because the circuitry of PWM 34 is only working within a system clock time reference. The conversion can be viewed as a technique for specifying where the edge is desired within a given pixel such that, with PWM code, if one wants to put an edge; for example, at the 40% point on a given pixel, it is necessary to convert that edge from video clock time to system time clock because PWM 34 works only within a system clock time reference.

More particularly, the PWM code is manipulated in order to deliver an edge to the specified point, such as the 40% point in the above example, of a given video clock. Forty percent is taken out of the video clock, and that portion is converted to some fraction of a system clock. Subsequently, it becomes necessary to identify which system clock needs to be used in order to output the edge. By converting from one clock domain to another clock domain, so that specified point (or 40%) of the video clock would be a specific value, say, the 78% point of the second system clock down the road, the conversion is carried out.

For the circuitry of PWM 34 in FIG. 2, the circuitry multiplies the video clock cycle number that is needed so that the PWM code will issue in the edge within the right system clock cycle. More particularly, VCLK is multiplied by the ratio of SCLK over VCLK. An integer portion of the resulting value identifies on which system clock cycle a particular video edge must occur in. The remaining fractional part identifies which system clock edge tap to use. Accordingly, the clock cycle that is needed is identified.

After the circuitry multiplies the video clock cycle number such that the PWM code will be issued in the edge within the right system clock cycle, it is multiplied by the system clock to video clock ratio contained within the register of block 126. By multiplying these two values, a number is derived in terms of system clock cycles, instead of video clock cycles. Such number identifies "when" during system clock cycles and "what" the system will do, such that it will be done in such a way that it looks as if it were a video clock. However, there is no actual video clock present. Instead, a desired video clocked output is generated from the system clock. Essentially, video output is synthesized which behaves, or acts, as if it is a true video clock output (even though there is no video clock). By realizing the system clock edge point that is needed, then converting it to a point using prior art techniques used in a laser printer pulse width modulator (PWM), the conversion is carried out for the edge number by some value, such as by 0.78%. That number is converted to one having a resolution that is desired within a pixel. For the example described above, the number happens to be 1 in 32. For example, 0.78 is multiplied by 32 so as to end up with 25. Accordingly, on the 25$^{th}$ tap, an edge is placed which is output to the video output. Such value is delivered from block 120 to summer 132 where it is summed.

Details of pulse width modulator implementations that are presently understood in the art are provided within U.S. Pat. No. 5,990,923, entitled "High Resolution Dynamic Pulse Width Modulation", naming Robert D. Morrison as the inventor, herein incorporated by reference as evidencing the state of the art. Additional teaching can be found in co-pending U.S. patent application having USPTO Ser. No. 09/293,520 entitled "A PULSE WIDTH MODULATOR USING DELAY-LINE TECHNOLOGY WITH AUTOMATIC CALIBRATION OF DELAYS TO DESIRED OPERATING FREQUENCY", naming as inventors Eugene A. Roylance and Wayne E. Bradburn, and herein incorporated by reference.

Furthermore, it is necessary to add in a phase offset which is computed when carrying out a phase alignment to the beam detect. This phase offset is fixed for each scan line. The computation of the phase offset is required in order to correctly line up all the scan lines.

There exists another problem in that, because the system clocks are not aligned to the video clocks, if you have an edge that needs to be output on a given video clock cycle, that edge gets converted so that it is output on a given system clock cycle. However, if there is a dual percentage point of a video clock cycle for that which is desired for an output; in other words, if it is desired to output an edge as soon as a pixel is started, there is trouble in that the system clocks are almost never aligned up to the video clocks so there is a fractional part of the video clock that needs to also be added into that edge. That fractional part will compensate for the fact that the current system clock is not lined up with the video clock edge where it is desirable to have output a video PWM code.

Three parts are needed in order to generate a synthesized video clocked output from a system clock, pursuant to the above-described implementation. First, a system clock count plus a fractional portion is needed. Secondly, a phase adjustment part is needed. Thirdly, a compensation is needed for the difference between the video clock rising edge and the system clock rising edge present at that system clock cycle. Such compensation is implemented for the fact that the system clock rising edge and the video clock rising edge do not occur at the same time, which necessitates implementation of the compensation. In essence, compensation is carried out because the rising edge is not present at the same point.

Block 120 converts the fractional part of the value "NEXT VCLK" within block 108 pursuant to rule 116 by converting SCLK taps (5-bit multiply) in order to compensate for the fact that the video clock that is desired to output the edge is not lined up precisely with the system clock from which it is being operated on. Accordingly, it is necessary to add the outputs from blocks 120, 128 and 122 at the summer of block 132. Block 122 accommodates the phase offset. Once these above-described three items are added together within block 132, an edge is specified within the system clock domain where it is desired to generate an output. The resulting output looks like it has been generated off a video clock, even though the entire system of PWM 34 is being run on a system clock; namely, system clock 54 of microprocessor 30 (of FIG. 1).

Accordingly, three things are computed in order to determine when to output an edge on a system clock so that it will appear as if it is generated by a video clock. First, a phase offset is generated via block 122. Secondly, it is determined which system clock cycle the edge needs to be output on by way of the "STALL IF" condition generated by rule 130 from block 110 which generates a stall condition at output 140. Furthermore, a fractional part will compute with the system clock time domain, converting the fractional part to system clocks by multiplying, and that has to be added in because the video clock and system clock are not aligned. Accordingly, an edge needs to be output. The edge needs to be moved a small amount in order to compensate for the condition that the system clock and generated video clock are necessarily lined up. The third and final requirement is to locate the PWM code edge, which could otherwise be present anywhere within a given clock cycle. Such three values are then added together within the summer of block 132, resulting in an output that appears as if it is generated via a video clock. Such video output will look like edges are being output, wherein the system outputs edges every video clock cycle. By carrying out these computations, even though the entire system is running on a system clock cycle, all the video clocked edges will have been properly computed and will occur at their desired location.

As discussed above, a phase measuring circuit within block 122 will compute a phase offset for the beam detect; block 120 will cooperate with associated circuitry to include a clock offset for the fact that the system clocks and video clocks do not line up; and blocks 124, 126 and 128 cooperate with associated circuitry to include the specified code time within a pixel resulting from PWM code at input 123. Accordingly, it may be desirable to just generate a fraction of a pixel as was described above.

FIG. 3 discloses a logic flow diagram for the programming of general circuitry, or processing circuitry, of system 10 depicted above with reference to FIG. 1. The following steps list a method for rendering video data for a laser of an image transfer device with a clock independent pulse width modulator (PWM) at a frequency that is independent of the operating frequency of the pulse width modulator (PWM).

In Step "S1", a pulse width modulator (PWM), a laser, and a system clock are provided. The laser is configured to generate an optical scan path onto an image transfer surface in response to video data that is received from the pulse width modulator. The pulse width modulator (PWM) renders video data for the laser. After performing Step "S1", the process proceeds to Step "S2".

In Step "S2", the process proceeds to detecting a phase offset on a scan line of a laser. After performing Step "2", the process proceeds to Step "S3".

In Step "S3", the process proceeds to determining on which system clock cycle to output an edge such that the system clock is configured like a video clock. After performing Step "S3", the process proceeds to Step "S4".

In Step "S4", the process proceeds with locating placement of an edge for a given pixel. After performing Step "S4", the process proceeds to Step "S4".

In Step "S5", the process proceeds with combining values from the detected phase offset, the edge output, and the edge location to generate a desired video clocked output. After performing Step "S4", the process terminates.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A system for enabling a pulse width modulator to render video data for a laser at a frequency independent of the operating frequency of the pulse width modulator, the system comprising:

phase measuring circuitry operative to detect a phase offset on a scan line for the laser;

edge output determining circuitry operative to determine which system clock cycle to output an edge on the system clock to act as if it were on a video clock;

edge location circuitry operative to implement pulse width modulation (PWM) in order to locate placement of an edge for a given pixel; and a summer communicating with the phase measuring circuitry, the edge output determining circuitry, and the edge location circuitry, the summer operative to combine values from the phase measuring circuitry, the edge output determining circuitry, and the edge location circuitry to generate a desired video signal.

2. The system of claim 1 wherein the phase measuring circuitry comprises a phase adjusted pulse width modulator configured to measure the phase of a beam detect signal.

3. The system of claim 1 wherein the phase measuring circuitry, the edge output determining circuitry, and the edge location circuitry are provided on an application specific integrated circuit (ASIC).

4. The system of claim 1 wherein the phase measuring circuitry, the edge output determining circuitry, and the edge location circuitry cooperate to provide clock translation circuitry.

5. The system of claim 1 wherein the phase measuring circuitry, the edge output determining circuitry, the edge location circuitry, and the summer are provided on an application specific integrated circuit (ASIC).

6. A system for enabling a pulse width modulator to render video data for a laser at a frequency independent of the operating frequency of the pulse width modulator, the system comprising:

phase measuring circuitry operative to detect a phase offset on a scan line for the laser;

edge output determining circuitry operative to determine which system clock cycle to output an edge on the system clock to act as if it were on a video clock;

edge location circuitry comprising pulse width modulator code edge location circuitry operative to locate placement of an edge for a given pixel; and a summer communicating with the phase measuring circuitry, the edge output determining circuitry, and the edge location circuitry, the summer operative to combine values from the phase measuring circuitry, the edge output determining circuitry, and the edge location circuitry to generate a desired video signal.

7. A system for enabling a pulse width modulator to render video data for a laser at a frequency independent of the operating frequency of the pulse width modulator, the system comprising:

phase measuring circuitry operative to detect a phase offset on a scan line for the laser;

edge output determining circuitry operative to determine which system clock cycle to output an edge on the system clock to act as if it were on a video a clock;

edge location circuitry operative to locate placement of an edge for a given pixel; and a summer communicating with the phase measuring circuitry, the edge output determining circuitry, and the edge location circuitry, the summer operative to combine values from the phase measuring circuitry, the edge output determining circuitry, and the edge location circuitry to generate a desired video signal;

wherein the edge output determining circuitry compares a current video clock value with a next video clock value, wherein the current video clock value and the next video clock value are derived from the system clock, and wherein the edge output determining circuitry compares an integer portion of the current video clock value and the next video clock value, and instructs video circuitry to stall when the integer portion changes.

8. A system for enabling a pulse width modulator to render video data for a laser at a frequency independent of the operating frequency of the pulse width modulator, the system comprising:

phase measuring circuitry operative to detect a phase offset on a scan line for the laser;

edge output determining circuitry operative to determine which system clock cycle to output an edge on the system clock to act as if it were on a video clock;

edge location circuitry operative to locate placement of an edge for a given pixel;

a summer communicating with the phase measuring circuitry, the edge output determining circuitry, and the edge location circuitry, the summer operative to combine values from the phase measuring circuitry, the edge output determining circuitry, and the edge location circuitry to generate a desired video signal; and a register configured to carry a ratio of the present video clock value to the system clock value.

9. The system of claim 8 further comprising another summer configured to combine a present value from the register and a current video clock value.

10. A clock-independent pulse width modulator, comprising:

a pulse width modulator (PWM) operative to generate video data for rendering an image via a laser;

a system clock operative to generate a system clock signal;

circuitry including phase offset measuring circuitry, edge output determining circuitry, and edge location circuitry, the phase offset measuring circuitry is operative to detect a phase offset on a scan line of the laser, the edge output determining circuitry is operative to determine which system clock cycle to output an edge on the system clock to act as if it were on a video clock, and the edge location circuitry is operative to locate placement of an edge for a given pixel; and a summer communicating with the phase measuring circuitry, the edge output determining circuitry, and the edge location circuitry, the summer operative to combine values from the phase offset measuring circuitry, the edge output determining circuitry, and the edge location circuitry to generate a desired video signal.

11. The clock-independent pulse width modulator of claim 10 wherein a cumulative error correction implementation is used to determine edge placement.

12. The clock-independent pulse width modulator of claim 10 wherein the circuitry comprises clock translation circuitry.

13. A clock-independent pulse width modulator, comprising:

a pulse width modulator (PWM) operative to generate video data for rendering an image via a laser;

a system clock operative to generate a system clock signal;

circuitry including phase offset measuring circuitry, edge output determining circuitry, and edge location circuitry, the phase offset measuring circuitry is operative to detect a phase offset on a scan line of the laser, the edge output determining circuitry is operative to determine which system clock cycle to output an edge on the system clock to act as if it were on a video clock, and the edge location circuitry is operative to locate placement of an edge for a given pixel; and a summer communicating with the phase measuring circuitry, the edge output determining circuitry, and the edge location circuitry, the summer operative to combine values from the phase offset measuring circuitry, the edge output determining circuitry, and the edge location circuitry to generate a desired video signal;

wherein a cumulative error correction implementation is used to determine edge placement; and wherein a video period time is programmed into a register wherein any frequency attainable by the PWM can be specified as a video frequency.

14. A clock-independent pulse width modulator, comprising:

a pulse width modulator (PWM) operative to generate video data for rendering an image via a laser;

a system clock operative to generate a system clock signal;

circuitry including phase offset measuring circuitry, edge output determining circuitry, and edge location circuitry, the phase offset measuring circuitry is operative to detect a phase offset on a scan line of the laser, the edge output determining circuitry is operative to determine which system clock cycle to output an edge on the system clock to act as if it were on a video clock, and the edge location circuitry is operative to locate placement of an edge for a given pixel; and a summer communicating with the phase measuring circuitry, the edge output determining circuitry, and the edge location circuitry, the summer operative to combine values from the phase offset measuring circuitry, the edge output determining circuitry, and the edge location circuitry to generate a desired video signal; and wherein the pulse modulator, the circuitry, and the summer are provided on an application specific integrated circuit (ASIC).

15. A method of rendering an image onto an image transfer surface, comprising:

providing a laser, a pulse width modulator (PWM), and a system clock, the laser configured to generate an optical scan path onto an image transfer surface in response to video data that is received from the pulse width modulator;

detecting a phase offset on a scan line of the laser;

determining on which system clock cycle to output an edge such that the system clock is configured like a video clock;

locating placement of an edge for a given pixel; and combining values from the detected phase offset, the edge output, and the edge location to generate a desired video signal.

16. The method of claim 15 wherein a summer is used in the step of combining values from the detected phase offset, the edge output, and the edge location to generate the desired video signal.

17. A method of rendering an image onto an image transfer surface, comprising:

providing a laser, a pulse width modulator (PWM), and a system clock, the laser configured to generate an optical scan path onto an image transfer surface in response to video data that is received from the pulse width modulator;

detecting a phase offset on a scan line of the laser;

determining on which system clock cycle to output an edge such that the system clock is configured like a video clock;

locating placement of an edge for a given pixel; and combining values from the detected phase offset, the edge output, and the edge location to generate a desired video signal;

wherein the system clock comprises a processor clock from a microprocessor, and wherein a video frequency is calculated by computing a PWM edge placement.

18. A method of rendering an image onto an image transfer surface, comprising:

providing a laser, a pulse width modulator (PWM), and a system clock, the laser configured to generate an optical scan path onto an image transfer surface in response to video data that is received from the pulse width modulator;

detecting a phase offset on a scan line of the laser;

a determining on which system clock cycle to output an edge such that the system clock is configured like a video clock;

locating placement of an edge for a given pixel; and combining values from the detected phase offset, the edge output, and the edge location to generate a desired video signal;

wherein the system clock is generated from a reference oscillator, and wherein a programmable video frequency is generated from the system clock.

19. A method of rendering an image onto an image transfer surface, comprising:

providing a laser, a pulse width modulator (PWM), and a system clock, the laser configured to generate an optical scan path onto an image transfer surface in response to video data that is received from the pulse width modulator;

detecting a phase offset on a scan line of the laser;

determining on which system clock cycle to output an edge such that the system clock is configured like a video clock;

locating placement of an edge for a given pixel; and combining values from the detected phase offset, the edge output, and the edge location to generate a desired video signal;

wherein a video output is generated on an edge of the system clock, a next video clock is compared with a current video clock, and video circuitry is intermittently stalled when the system clock is running faster than a desired video clock.

20. A method of rendering an image onto an image transfer surface, comprising:

providing a laser, a pulse width modulator (PWM), and a system clock, the laser configured to generate an optical scan path onto an image transfer surface in response to video data that is received from the pulse width modulator;

detecting a phase offset on a scan line of the laser;

determining on which system clock cycle to output an edge such that the system clock is configured like a video clock;

locating placement of an edge for a given pixel; and combining values from the detected phase offset, the edge output, and the edge location to generate a desired video signal;

wherein a stall condition is delivered to video circuitry when the system clock is running at a rate that generates video data that exceeds the video capabilities of the video circuitry.

* * * * *

UNITED STATES PATENT AND TRADEMARK OFFICE
CERTIFICATE OF CORRECTION

PATENT NO.    : 6,366,307 B1
DATED         : April 2, 2002
INVENTOR(S)   : Morrison It is certified that error appears in the above-identified patent and that said Letters Patent is hereby corrected as shown below:

<u>Column 5,</u>
Line 11, delete "sign" and insert therefor -- signals --.

Signed and Sealed this

Third Day of February, 2004

JON W. DUDAS
*Acting Director of the United States Patent and Trademark Office*